(12) United States Patent
Park

(10) Patent No.: US 10,274,023 B2
(45) Date of Patent: Apr. 30, 2019

(54) DOUBLE CLUTCH ASSEMBLY AND DEVICE FOR ASSISTING ACTUATOR OF THE SAME

(71) Applicant: HYUNDAI MOTOR COMPANY, Seoul (KR)

(72) Inventor: In Tae Park, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 408 days.

(21) Appl. No.: 15/189,094

(22) Filed: Jun. 22, 2016

(65) Prior Publication Data

US 2017/0159722 A1    Jun. 8, 2017

(30) Foreign Application Priority Data

Dec. 3, 2015   (KR) .................. 10-2015-0171748

(51) Int. Cl.
*F16D 21/06*       (2006.01)
*F16D 23/12*       (2006.01)

(52) U.S. Cl.
CPC ............. *F16D 23/12* (2013.01); *F16D 21/06* (2013.01); *F16D 2021/0684* (2013.01); *F16D 2023/126* (2013.01)

(58) Field of Classification Search
CPC .......... F16D 21/06–2021/0684; F16D 23/12–2323/126
See application file for complete search history.

(56) References Cited

U.S. PATENT DOCUMENTS

| 6,012,561 | A | * | 1/2000 | Reed, Jr. | ................. F16D 23/12 192/48.2 |
| 7,311,015 | B2 | | 12/2007 | Kluge | |
| 8,381,889 | B2 | * | 2/2013 | Burkhart | ................. F16D 25/08 192/48.607 |
| 8,844,390 | B2 | | 9/2014 | Bowen et al. | |
| 8,893,869 | B2 | * | 11/2014 | Oh | ......................... F16D 23/12 192/48.2 |
| 9,010,510 | B2 | | 4/2015 | Gerundt et al. | |
| 2014/0326094 | A1 | | 11/2014 | Bünder | |
| 2015/0152944 | A1 | | 6/2015 | Buender | |

FOREIGN PATENT DOCUMENTS

KR    10-1220370 B    1/2013
KR    10-2014-0064291    5/2014

* cited by examiner

*Primary Examiner* — Richard M Lorence
(74) *Attorney, Agent, or Firm* — Brinks Gilson & Lione

(57) ABSTRACT

The present disclosure provides a double clutch assembly and a device for assisting an actuator of the double clutch. The device applies an assistance force to the actuator upon an operation of the actuator. In particular, the double clutch assembly includes first and second actuators which engage or disengage first and second clutches, respectively. The device includes: an elastic member to apply an elastic force; a first transfer portion to transfer the elastic force of the elastic member to the first actuator; and a second transfer portion to transfer the elastic force of the elastic member to the second actuator.

13 Claims, 10 Drawing Sheets

DOUBLE CLUTCH ASSEMBLY AND DEVICE FOR ASSISTING ACTUATOR OF THE SAME

CROSS-REFERENCE TO RELATED APPLICATION

This application claims priority to and the benefit of Korean Patent Application No. 10-2015-0171748, filed on Dec. 3, 2015, which is incorporated herein in its entirety by reference.

FIELD

The present disclosure relates to a double clutch assembly and a device for assisting an actuator of the same.

BACKGROUND

The statements in this section merely provide background information related to the present disclosure and may not constitute prior art A double clutch transmission (DCT) has a double clutch assembly having two separate clutches for odd gear sets and even gear sets.

The double clutch assembly has two actuators for separately driving two clutches, in which the actuator may be configured of an electric motor, or the like.

However, as the high-capacity actuator is installed to stably maintain operability of a clutch, we have discovered that there is a disadvantage in that the existing double clutch assembly has a heavy weight, takes up a large installation space due to a large size, has high manufacturing costs, and has a high heat radiating amount.

SUMMARY

The present disclosure provides a double clutch assembly and a device for assisting an actuator of the same capable of reducing capacity of the actuator by applying an assistance force to each of the actuators upon an operation of each of the actuators.

According to one form of the present disclosure, a device for assisting an actuator of a double clutch assembly having first and second actuators separately engaging and disengaging first and second clutches includes: an elastic member configured to apply an elastic force; a first transfer portion configured to transfer the elastic force of the elastic member to the first actuator; and a second transfer portion configured to transfer the elastic force of the elastic member to the second actuator.

The first actuator may have a first output member moving upon an operation of the first actuator and the first transfer portion may have a first rack fixed to the first output member and a first pinion engaged with the first rack.

The second actuator may have a second output member moving upon an operation of the second actuator and the second transfer portion may have a second rack fixed to the second output member and a second pinion engaged with the second rack.

The elastic member may be configured of a torsion spring interposed between the first pinion and the second pinion to apply the elastic force to the first pinion and the second pinion in a rotation direction.

The elastic member may apply the elastic force to move the first and second racks in the same direction as a direction in which the first and second output members move upon the operation of the first and second actuators.

According to another form of the present disclosure, a device for assisting an actuator of a double clutch assembly having first and second actuators includes: a first elastic member configured to separately apply an elastic force to the first actuator; a second elastic member configured to separately apply an elastic force to the second actuator; and a pivot member configured to support the first elastic member and the second elastic member and be pivotally installed between the first elastic member and the second elastic member.

The first actuator may have a first output member moving upon an operation of the first actuator and the first elastic member may be configured of a coil spring applying the elastic force in a longitudinal direction of the first output member.

The second actuator may have a second output member moving upon an operation of the second actuator and the second elastic member may be configured of a coil spring applying an elastic force in a longitudinal direction of the second output member.

The pivot member may be pivotally installed between the first output member and the second output member.

The pivot member may have a first support protrusion supporting the first elastic member and a second support protrusion supporting the second elastic member.

The first output member may have a support tap protruding from one side thereof, an upper end of the first elastic member may be supported to the support tap of the first output member, and a lower end of the first elastic member may be supported to the first support protrusion of the pivot member.

The second output member may have a support tap protruding from one side thereof, an upper end of the second elastic member may be supported to the support tap of the second output member, and a lower end of the second elastic member may be supported to the second support protrusion of the pivot member.

According to another form of the present disclosure, a double clutch assembly includes: first and second clutches configured to be separately operated from each other; first and second actuators configured to separately engage or disengage the first and second clutches; first and second force transfer portions configured to transfer forces applied by the first and second actuators to the first and second clutches; and a device for assisting an actuator configured to selectively apply an assistance force to the first and second actuators.

The device for assisting an actuator may use an elastic force of an elastic member to apply the assistance force to the first and second actuators.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8:
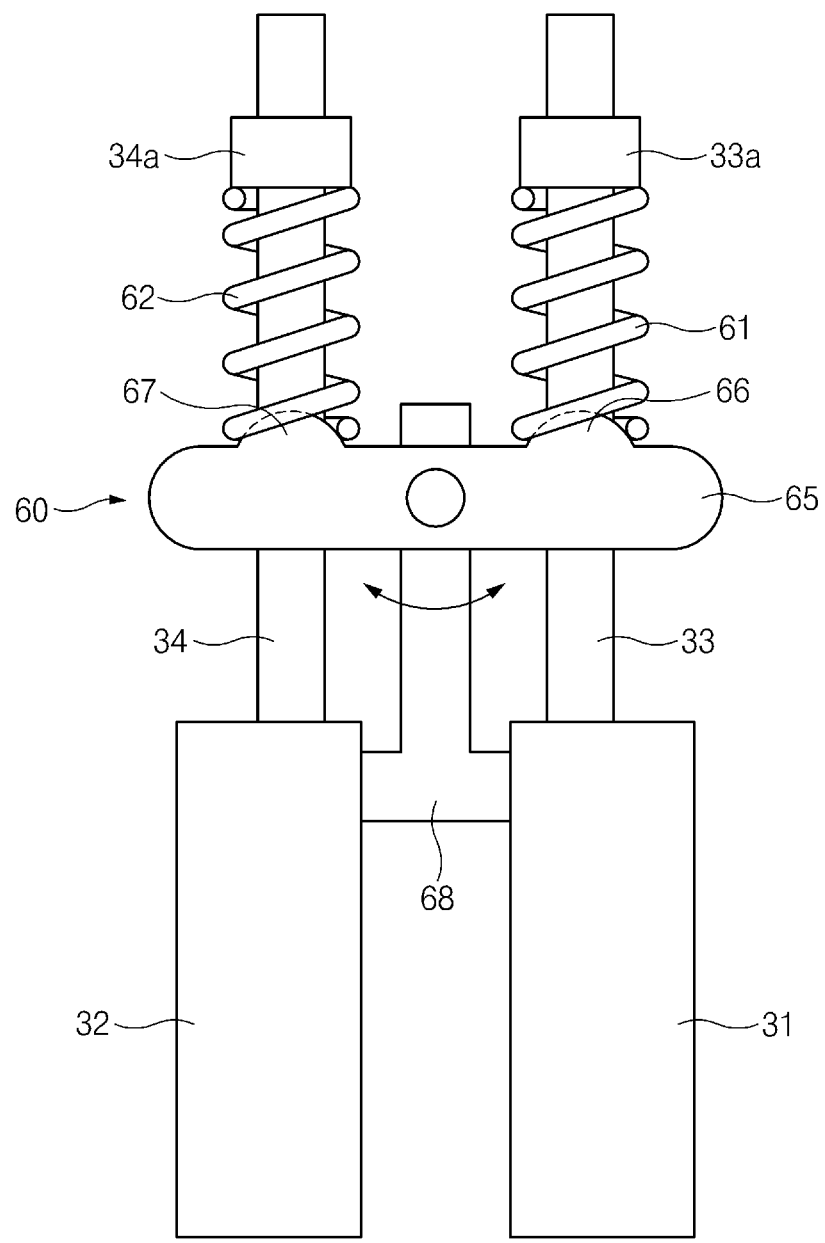
FIG. 8 is a diagram illustrating a device for assisting an actuator according to another form of the present disclosure.
Figure 9:
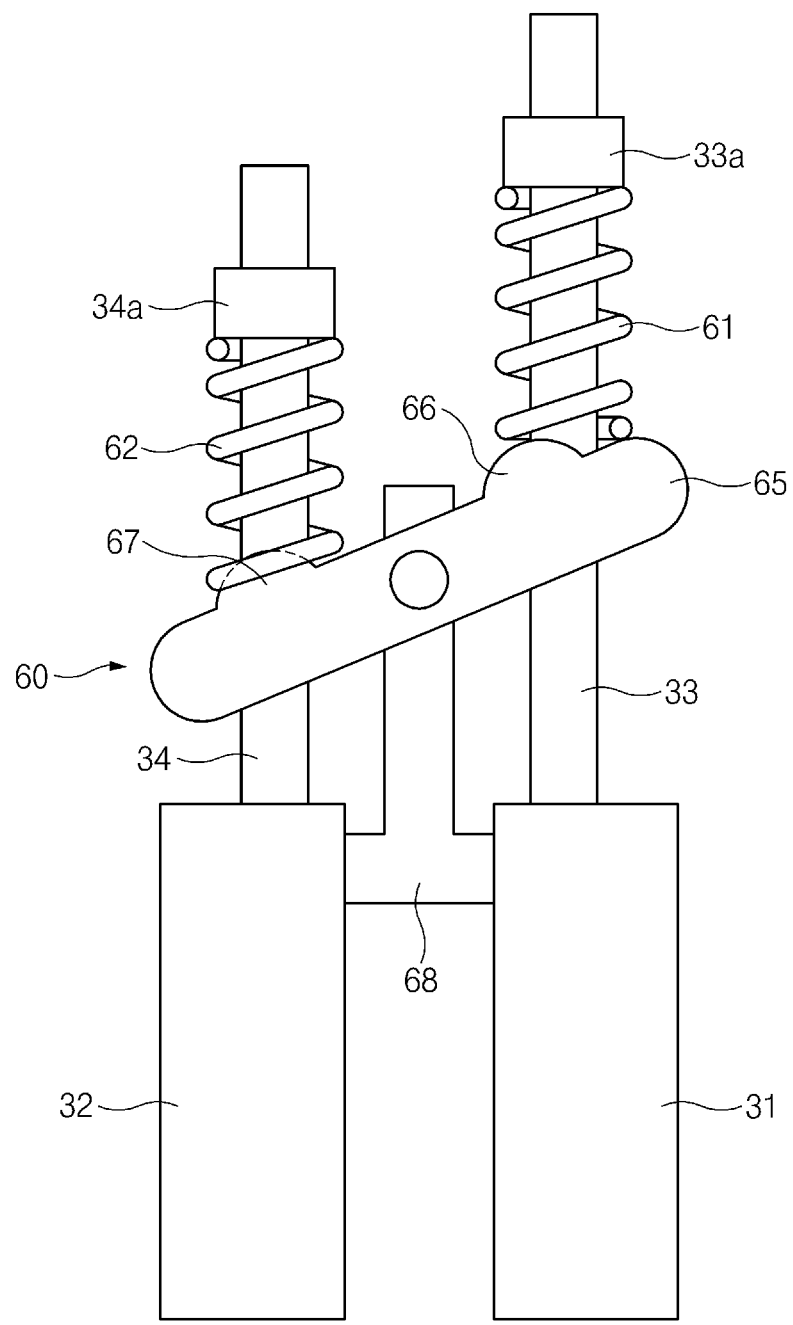
Figure 10:
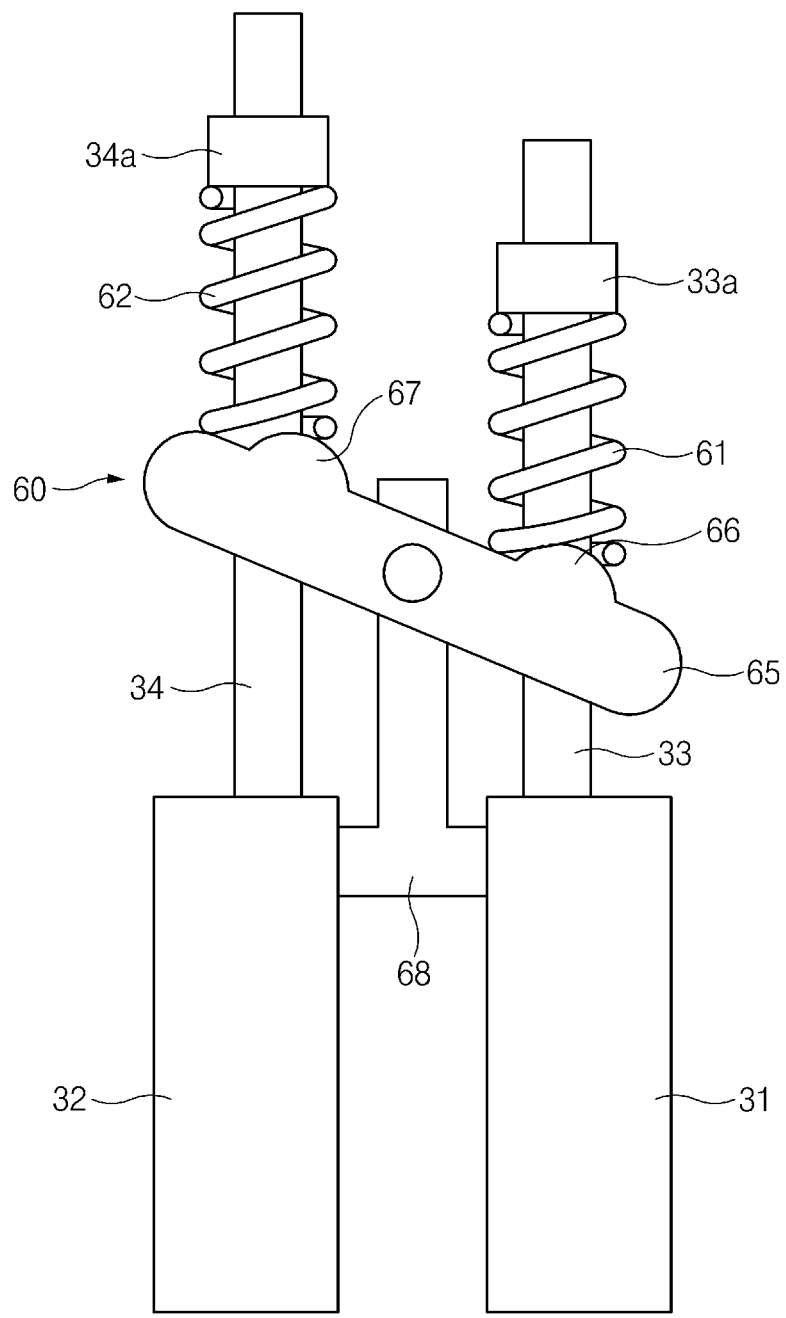

FIG. 9 is a diagram illustrating a state in which the assistance force is applied to the first output member by the device for assisting an actuator of FIG. 8 upon the operation of the first actuator; and FIG. 10 is a diagram illustrating a state in which the assistance force is applied to the second output member by the device for assisting an actuator of FIG. 8 upon the operation of the second actuator.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For reference, a size of components, a thickness of a line, and the like which are illustrated in the drawing referenced for describing exemplary forms of the present disclosure may be slightly exaggerated for convenience of understanding. Further, terms used to describe the present disclosure are defined in consideration of functions in the present disclosure and therefore may be changed depending on a user, an operator's intention, a practice, and the like. Therefore, the definition of the terminologies should be construed based on the contents throughout the specification.

Figure 1:
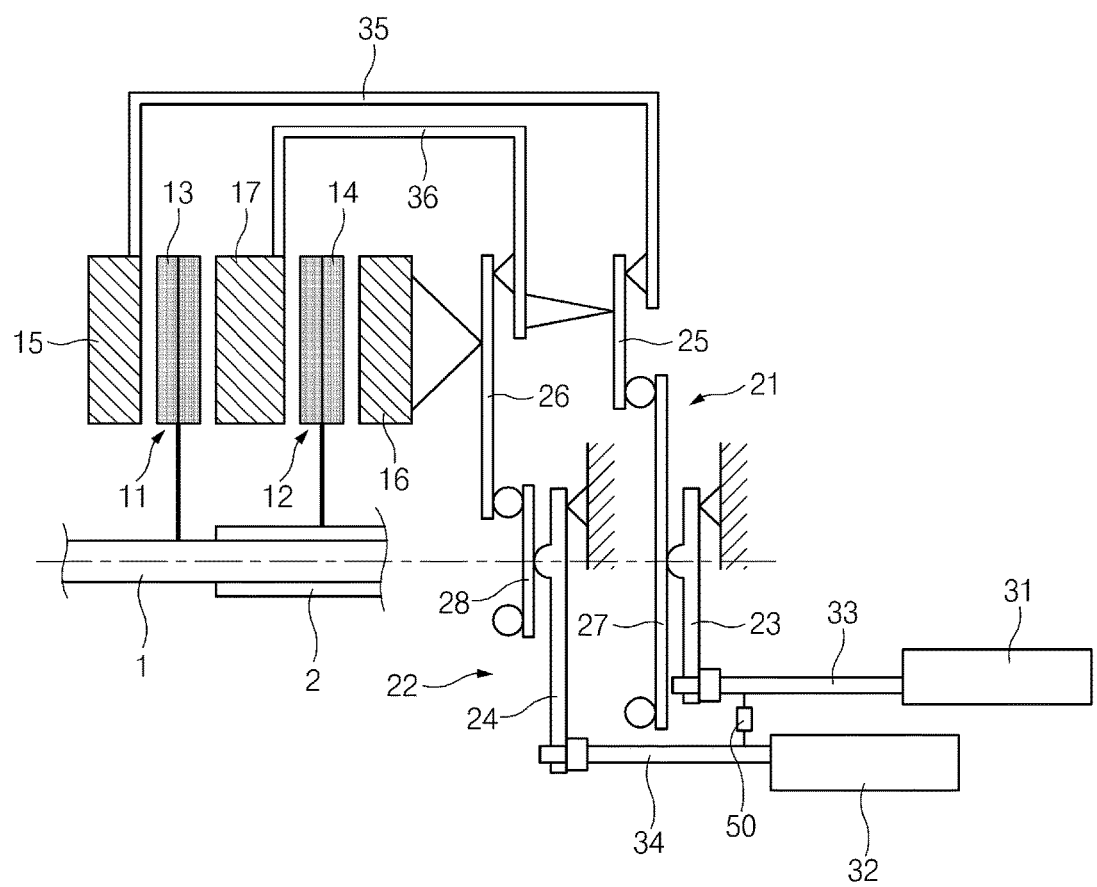
FIG. 1 is a diagram illustrating a double clutch assembly according to one form of the present disclosure.
Figure 2:
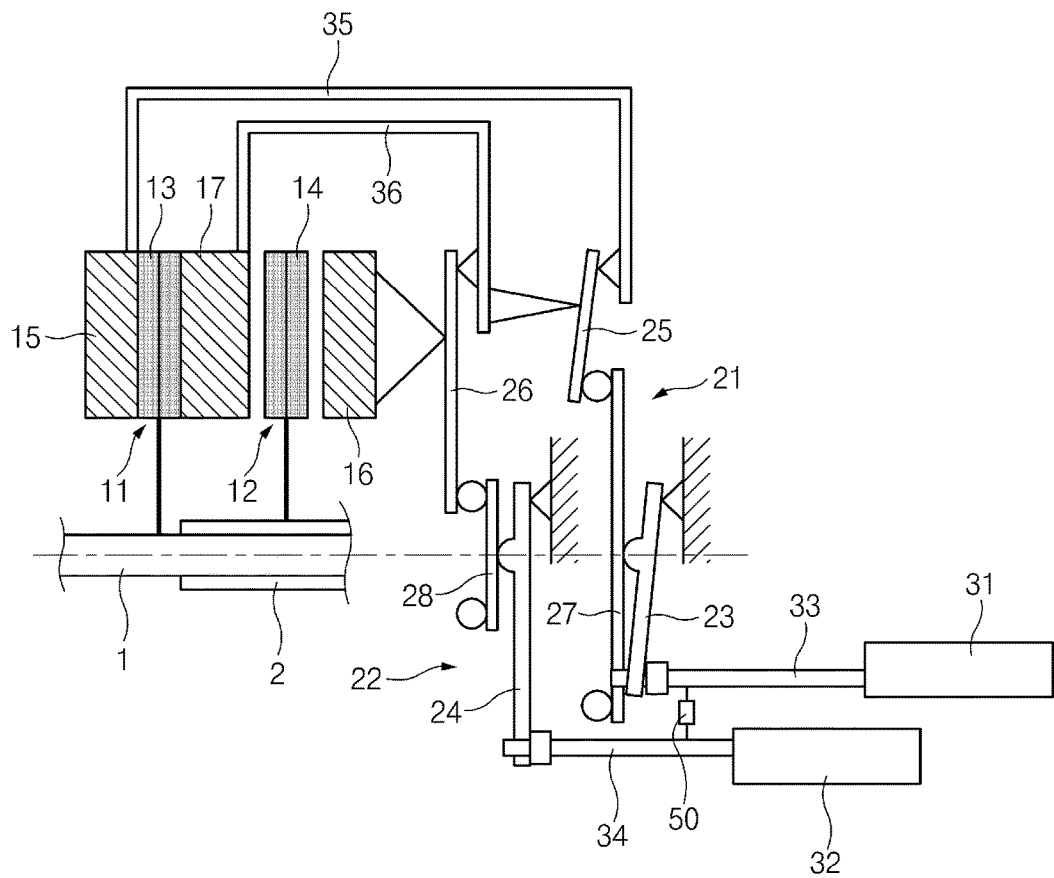
FIG. 2 is a diagram illustrating an engaged state of a first clutch in the double clutch assembly of FIG. 1.
Figure 3:
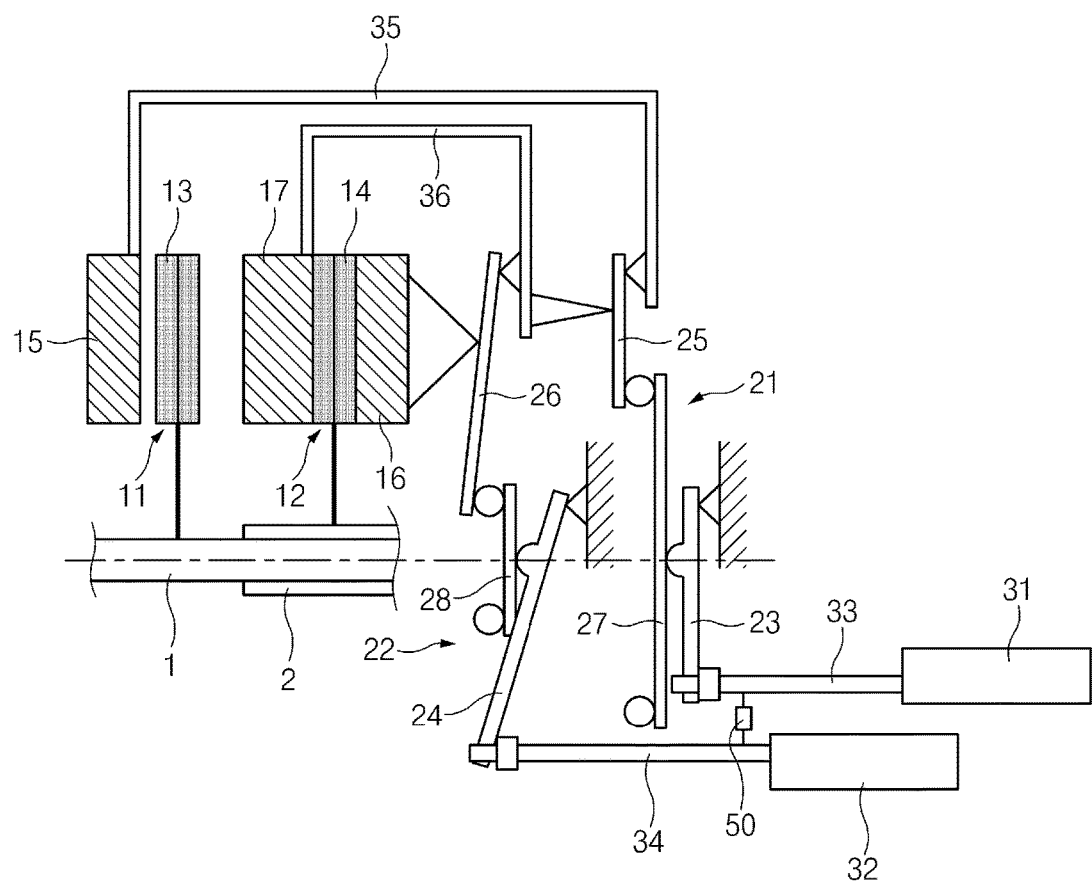
FIG. 3 is a diagram illustrating an engaged state of a second clutch in the double clutch assembly of FIG. 1.

FIGS. 1 to 3 are diagrams illustrating a double clutch assembly according to various forms of the present disclosure.

Referring to FIGS. 1 to 3, the double clutch assembly may include first and second clutches 11 and 12 separately operated from each other, and first and second actuators 31 and 32 for separately engaging and disengaging the first and second clutches 11 and 12.

The first clutch 11 may include a first clutch disc 13 connected to a first input shaft 1 of the transmission and a first pressure plate 15 adjacent to the first clutch disc 13.

The second clutch 12 may include a second clutch disc 14 connected to a second input shaft 2 of the transmission and a second pressure plate 16 adjacent to the second clutch disc 14.

A middle plate 17 is installed between the first clutch disc 13 of the first clutch 11 and the second clutch disc 14 of the second clutch 12, in which the middle plate 17 may be selectively in frictional contact with the first clutch disc 13 and the second clutch disc 14.

Further, a first force transfer portion 21 is installed between the first clutch 11 and the first actuator 31 and a force from the first actuator 31 may be transferred to the first clutch 11 by the first force transfer portion 21.

The first force transfer portion 21 may include a first fork 23 connected to the first actuator 31 and a first diaphragm spring 25 connected to the first fork 23.

The first fork 23 is connected to a first output member 33 of the first actuator 31, and therefore as the first output member 33 moves forward by an operation of the first actuator 31, the first fork 23 may pivot. Here, the first actuator 31 may be an electric motor, a reducer, or the like and the first output member 33 may also be a rod or a cylinder moving forward or reverse by the electric motor and the reducer.

The first diagram spring 25 is connected to the first fork 23 through a first bearing 27, and as the first fork 23 pivots by the first actuator 31, as illustrated in FIG. 2, the first bearing 27 may press one side of the first diaphragm spring 25 to operate the first diaphragm spring 25.

The first diaphragm spring 25 and the first pressure plate 15 may be connected to each other by a first connection member 35, and therefore a force from the first diaphragm spring 25 may be transferred to the first pressure plate 15 through the first connection member 35.

The engaging operation of the first clutch 11 will be described below in detail with reference to FIG. 2.

As the first output member 33 moves forward by the operation of the first actuator 31, the first fork 23 pivots, and as a result the first bearing 27 may move forward. The first diaphragm spring 25 is operated by the forward movement of the first bearing 27 and therefore the first connection member 35 is pulled, such that the first pressure plate 15 may press the first clutch disc 13 to the middle plate 17. By doing so, the first pressure plate 15 and the middle plate 17 are in frictional contact with both side surfaces of the first clutch disc 13, and as a result the engaging operation of the first clutch 11 may be made.

A second force transfer portion 22 is installed between the second clutch 12 and the second actuator 32 and a force from the second actuator 32 may be transferred to the second clutch 12 by the second force transfer portion 22.

The second force transfer portion 22 may include a second fork 24 connected to the second actuator 32 and a second diaphragm spring 26 connected to the second fork 24.

The second fork 24 is connected to a second output member 34 of the second actuator 32, and therefore as the second output member 34 moves forward by an operation of the second actuator 32, the second fork 24 may pivot. Here, the second actuator 32 may be the electric motor, the reducer, or the like, and the second output member 34 may also be the rod or the cylinder moving forward and reverse by the electric motor and the reducer.

The second diagram spring 26 is connected to the second fork 24 through a second bearing 28, and as the second fork 24 pivots by the second actuator 32, as illustrated in FIG. 3, the second bearing 28 may press one side of the second diaphragm spring 26 to operate the second diaphragm spring 26.

The second diaphragm spring 26 and the middle plate 17 are connected to each other by a second connection member 36, such that a force from the second diaphragm spring 26 may be transferred to the middle plate 17 through the second connection member 36. Further, the second pressure plate 16 may be supported to the second diaphragm spring 26.

The engaging operation of the second clutch 12 will be described below in detail with reference to FIG. 3.

As the second output member 34 moves forward or reverse by the operation of the second actuator 32, the second fork 24 pivots, and as a result the second bearing 28 may move forward. The second diaphragm spring 26 is operated by the forward movement of the second bearing 28 and therefore the second connection member 36 is pulled, such that the middle plate 17 may press the second clutch disc 14 to the second pressure plate 16. By doing so, and the second pressure plate 16 and the middle plate 17 are in frictional contact with both side surfaces of the second clutch disc 14, and as a result the engagement of the second clutch 12 may be made.

Further, in another form, the double clutch assembly may include a device 50 for assisting an actuator applying an assistance force upon the operation of each of the actuators 31 and 32.

The device 50 for assisting an actuator may apply the assistance force upon the operation of each of the actuators 31 and 32 to greatly reduce the capacity of actuators 31 and 32 compared to the related art, such that the small-capacity actuators 31 and 32 may be installed. Due to the application of the small-capacity actuators 31 and 32, the miniaturization and the weight reduction of the actuator may be implemented, thereby greatly saving the manufacturing costs and greatly reducing the heat radiating amount.

According to one form, as illustrated in FIGS. 4 to 7, the device 50 for assisting an actuator may be installed between the first output member 33 of the first actuator 31 and the second output member 34 of the second actuator 32 to apply the assistance force to the output members 33 and 34 upon the operation of each of the actuators 31 and 32.

Figure 4:
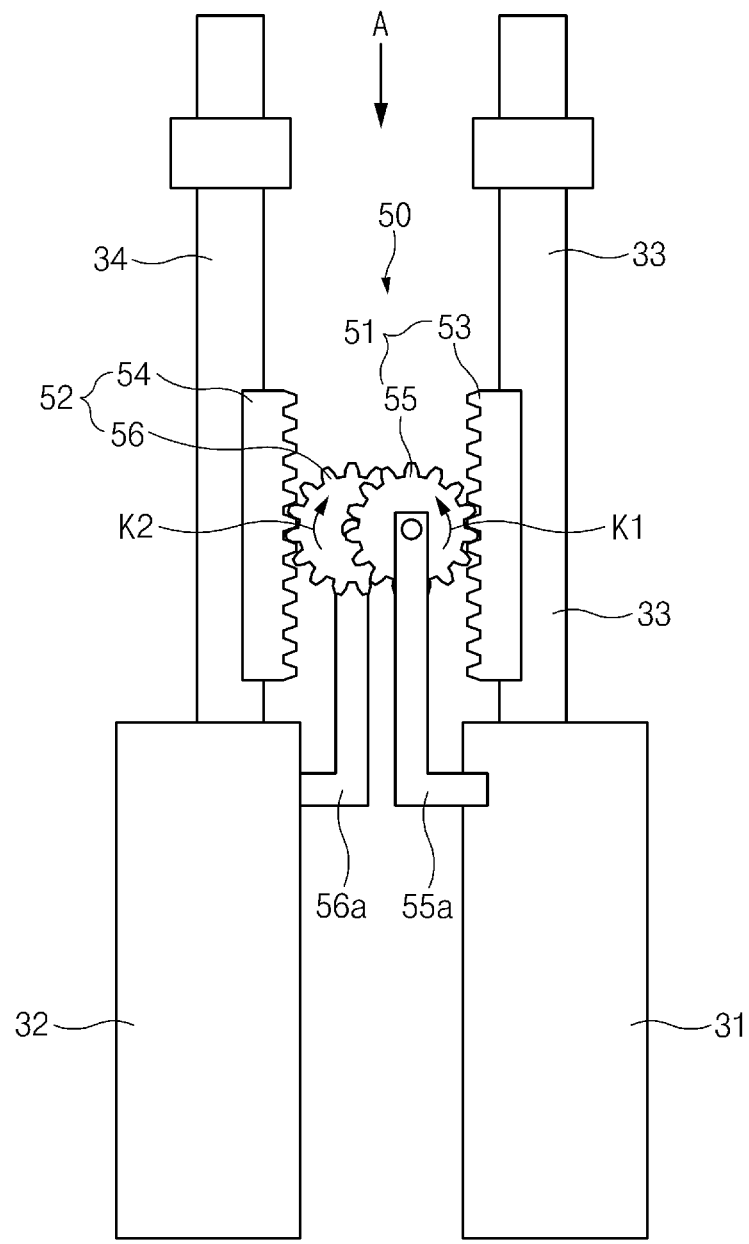
FIG. 4 is a diagram illustrating a device for assisting an actuator according to another form of the present disclosure.
Figure 5:
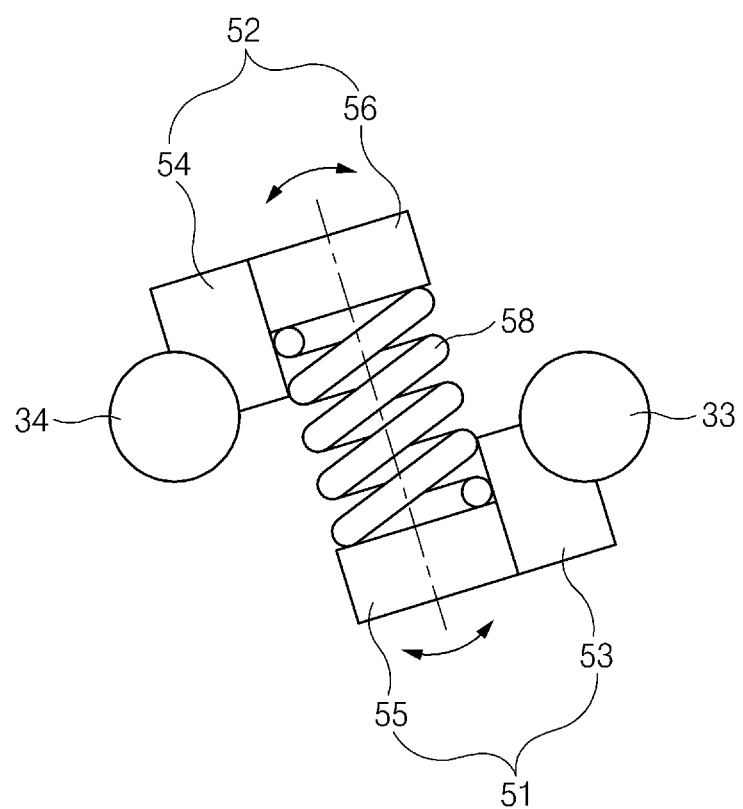
FIG. 5 is a view viewed from arrow direction A of FIG. 4.

As illustrated in FIGS. 4 and 5, the device 50 for assisting an actuator may include an elastic member 58 applying an elastic force, a first transfer portion 51 transferring the elastic force of the elastic member 58 to the first output member 33 of the first actuator 31, and a second transfer portion 52 transferring an elastic force of an elastic member 58 to the second output member 34 of the second actuator 32.

The elastic member 58 may be a torsion spring which may apply an elastic force in a circumferential direction, in which the torsion spring may have a pair of arms each of which may apply the elastic force.

The first transfer portion 51 may include a first rack 53 fixed to the first output member 33 of the first actuator 31 and a first pinion 55 engaged with the first rack 53. The first pinion 55 may be connected to a housing of the first actuator 31 through a first support frame 55*a*, a center of the first pinion 55 may be rotatably installed at an upper end of the first support frame 55*a*, and the first pinion 55 may be adjacently disposed to the first output member 33 of the first actuator 31.

The second transfer portion 52 may include a second rack 54 fixed to the second output member 34 of the second actuator 32 and a second pinion 56 engaged with the second rack 54. The second pinion 56 may be connected to a housing of the second actuator 32 through a second support frame 56*a*, a center of the second pinion 56 may be rotatably installed at an upper end of the second support frame 56*a*, and the second pinion 56 may be adjacently disposed to the second output member 34 of the second actuator 32.

An elastic member 58 may be interposed between the first pinion 55 and the second pinion 56, in particular, the elastic member 58 may be concentrically disposed with respect to the first pinion 55 and the second pinion 56 and each arm of the torsion spring may be separately engaged with the first pinion 55 and the second pinion 56. Therefore, the elastic member 58 may apply the elastic force to the first pinion 55 in a rotation direction (refer to arrow K1 direction of FIG. 4) upon the operation of the first actuator 31 and apply the elastic force to the second pinion 56 in a rotation direction (refer to arrow K2 direction of FIG. 4) upon the operation of the second actuator 32. As the first pinion 55 or the second pinion 56 rotates in a predetermined rotation direction by the elastic force of the elastic member 58, the first rack 53 or the second rack 54 may move longitudinally.

In particular, the elastic member 58 may apply the elastic force to move the first and second racks 53 and 54 in the same direction as the direction in which the first and second output members 33 and 34 move upon the operation of the first and second actuators 31 and 32.

Figure 6:
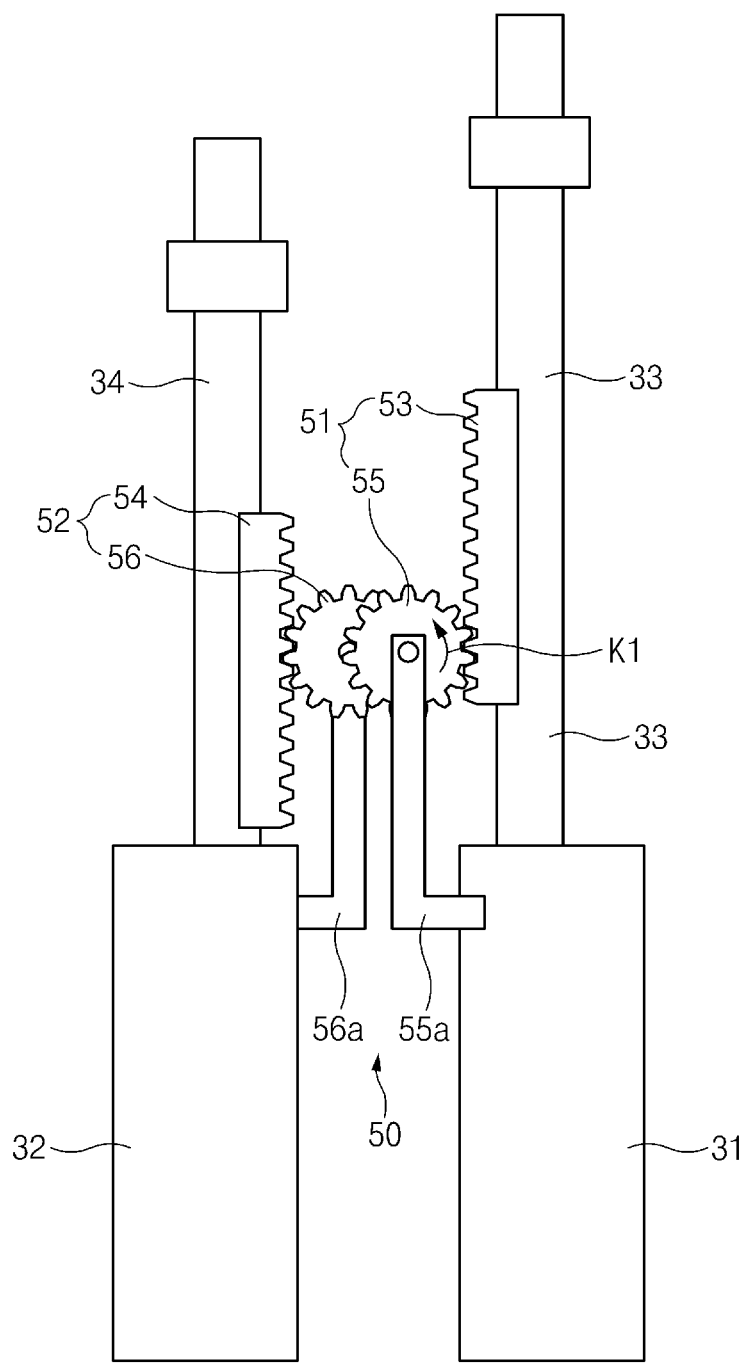
FIG. 6 is a diagram illustrating a state in which an assistance force is applied to a first output member by the device for assisting an actuator of FIG. 4 upon an operation of a first actuator.

When the first actuator 31 is operated for the engaging operation of the assistance force transfer first clutch 11 by the first transfer portion 51, as illustrated in FIG. 6, the first pinion 55 may be rotated by the elastic force of the elastic member 58. In this case, the first rack 53 may move straight by the rotating force of the first pinion 55 and the first output member 33 may be applied with the elastic force of the elastic member 58 as the assistance force by the straight movement of the first rack 53, in addition to the force applied by the first actuator 31.

In summary, the elastic force of the elastic member 58 may be applied to the first output member 33 through the first pinion 55 and the first rack 53 of the first transfer portion 51 as the assistance force. Reviewing this from the viewpoint of the equilibrium of force, the force applied by the first diaphragm spring 25 is the same as a summed value of the force applied by the first actuator 31 with the assistance force by the elastic member 58, and therefore a desired maximum output of the first actuator 31 may be set to be much lower than before, thereby reducing the capacity and size of the first actuator 31.

Figure 7:
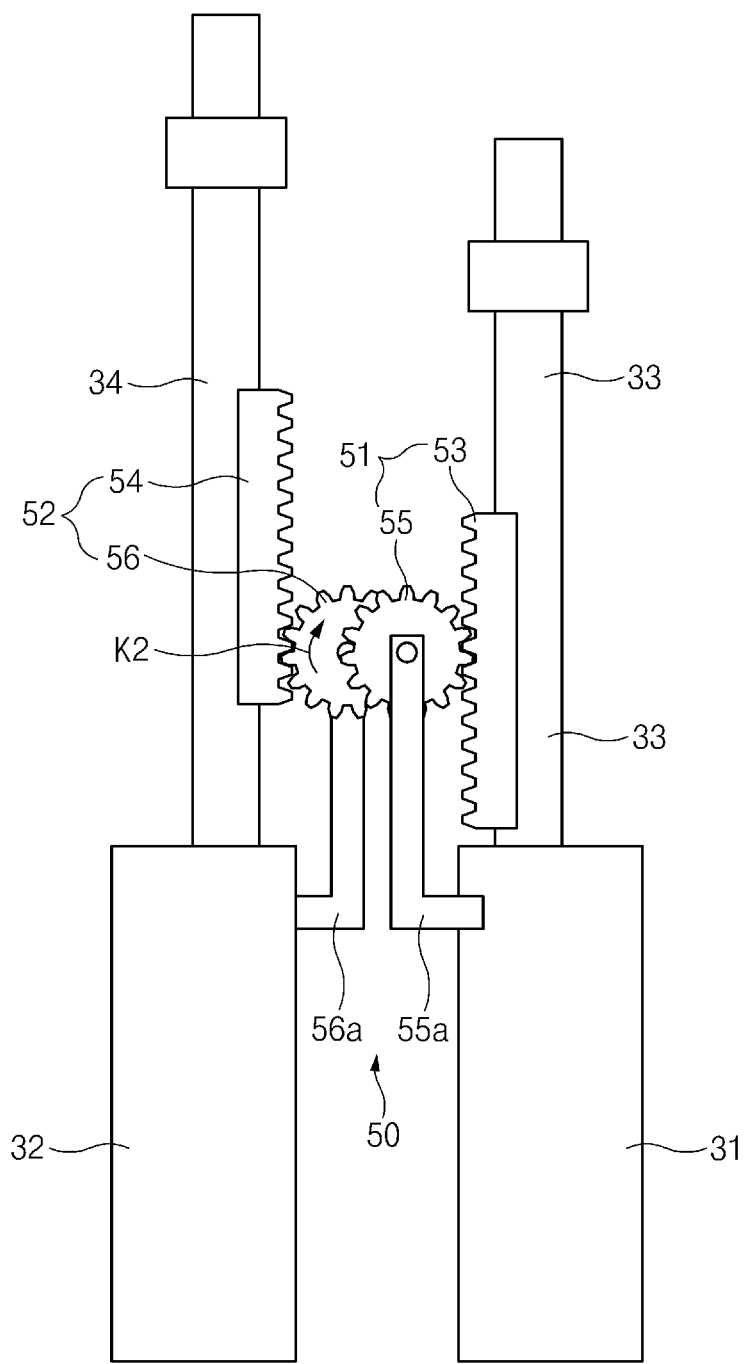
FIG. 7 is a diagram illustrating a state in which the assistance force is applied to a second output member by the device for assisting an actuator of FIG. 4 upon an operation of a second actuator.

When the second actuator 32 is operated for the engaging operation of the assistance force transfer second clutch 12 by the second transfer portion 52, as illustrated in FIG. 7, the second pinion 56 may be rotated by the elastic force of the elastic member 58. In this case, the second rack 54 may move straight by the rotating of the second pinion 56 and the second output member 34 may be applied with the elastic force of the elastic member 58 as the assistance force by the straight movement of the second rack 54, in addition to the force applied by the second actuator 32.

In summary, the elastic force of the elastic member 58 may be applied to the second output member 34 through the second pinion 56 and the second rack 54 of the second transfer portion 52 as the assistance force. Reviewing this from the viewpoint of the equilibrium of force, the force applied by the second diaphragm spring 26 is the same as a summed value of the force applied by the second actuator 32 with the assistance force by the elastic member 58, and therefore a desired maximum output of the second actuator 32 may be set to be much lower than before, thereby reducing the capacity and size of the second actuator 32.

FIGS. 8 to 10 illustrate a device 60 for assisting an actuator according to another form of the present disclosure.

Referring to FIGS. 8 to 10, the device 60 for assisting an actuator may include a first elastic member 61 installed to apply an elastic force along a longitudinal direction of the first output member 33, a second elastic member 62 installed to apply an elastic force along a longitudinal direction of the second output member 34, and a pivot member 65 pivotally installed between the first elastic member 61 and the second elastic member 62.

The first elastic member 61 may be a coil spring long installed on an outer surface of the first output member 33 to apply the elastic force along the longitudinal direction of the first output member 33.

The second elastic member 62 may be the coil spring long installed on an outer surface of the second output member 34 to apply the elastic force along the longitudinal direction of the second output member 34.

The pivot member 65 may be pivotally installed between the first output member 33 and the second output member 34 and may be connected to the housings of the first and second actuators 31 and 32 through a support frame 68, in which the support frame 68 may be disposed between the first output member 33 and the second output member 34. Further, the pivot member 65 has a middle part rotatably installed at an upper end of the support frame 68 and therefore the middle part of the pivot member 65 is formed with a pivot point, such that the pivot point of the pivot member 65 may be positioned between the first output member 33 and the second output member 34.

The pivot member 65 may have a first support protrusion 66 supporting the first elastic member 61 and a second support protrusion 67 supporting the second elastic member 62.

Meanwhile, the first output member 33 may have a support tap 33a protruding from one side thereof, an upper end of the first elastic member 61 may be supported on the support tap 33a of the first output member 33, and a lower end of the first elastic member 61 may be supported by the first support protrusion 66 of the pivot member 65. By doing so, the first elastic member 61 may be expanded or compressed corresponding to the movement of the first output member 33 to apply the elastic force to the first output member 33.

Further, the second output member 34 may have a support tap 34a protruding from one side thereof, an upper end of the second elastic member 62 may be supported on the support tap 34a of the second output member 34, and a lower end of the second elastic member 62 may be supported by the second support protrusion 67 of the pivot member 65. By doing so, the second elastic member 62 may be expanded or compressed corresponding to the movement of the second output member 34 to apply the elastic force to the second output member 34.

When the first actuator 31 is operated for the engaging operation of the first clutch 11, as illustrated in FIG. 9, the pivot member 65 pivots so that one side (right part in FIG. 9) of the pivot member 65 moves upwardly, such that the first support protrusion 66 presses the first elastic member 61 to directly apply the elastic force of the first elastic member 61 to the first output member 33. By doing so, the first output member 33 may be applied with the elastic force of the first elastic member 61 as the assistance force, in addition to the force applied by the first actuator 31.

In summary, the elastic force of the first elastic member 61 may be applied to the first output member 33 as the assistance force by the pivoting of the pivot member 65 upon the operation of the first actuator 31. Reviewing this from the viewpoint of the equilibrium of force, the force applied by the first diaphragm spring 25 is the same as a summed value of the force applied by the first actuator 31 with the assistance force by the first elastic member 61, and therefore a desired maximum output of the first actuator 31 may be set to be much lower than before, thereby reducing the capacity and size of the first actuator 31.

When the second actuator 32 is operated for the engaging operation of the second clutch, as illustrated in FIG. 10, the pivot member 65 pivots so that the other side (left part in FIG. 10) of the pivot member 65 moves upwardly, such that the second support protrusion 67 presses the second elastic member 62 to directly apply the elastic force of the second elastic member 62 to the second output member 34. By doing so, the second output member 34 may be applied with the elastic force of the second elastic member 62 as the assistance force, in addition to the force applied by the second actuator 32.

In summary, the elastic force of the second elastic member 62 may be applied to the second output member 34 as the assistance force by the pivoting of the pivot member 65 upon the operation of the second actuator 32. Reviewing this from the viewpoint of the equilibrium of force, the force applied by the second diaphragm spring 26 is the same as a summed value of the force applied by the second actuator 32 with the assistance force by the second elastic member 62, and therefore a desired maximum output of the second actuator 32 may be set to be much lower than before, thereby reducing the capacity and size of the second actuator 32.

As described above, the desired capacity of the actuator may be reduced by applying the assistance force to each of the actuators upon the operation of each of the actuators to implement the miniaturization, the weight reduction, or the like of the actuator, thereby saving the manufacturing costs and greatly reducing the heat radiating amount.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device for assisting an actuator of a double clutch assembly having first and second actuators separately engaging and disengaging first and second clutches, the device comprising:
    an elastic member configured to apply an elastic force;
    a first transfer portion configured to transfer the elastic force of the elastic member to the first actuator of the double clutch assembly; and
    a second transfer portion configured to transfer the elastic force of the elastic member to the second actuator of the double clutch assembly.

2. The device according to claim 1, wherein the first actuator includes a first output member configured to move by the first actuator, and the first transfer portion includes a first rack fixed to the first output member and a first pinion configured to engage with the first rack.

3. The device according to claim 2, wherein the second actuator includes a second output member configured to move by the second actuator, and the second transfer portion includes a second rack fixed to the second output member and a second pinion configured to engage with the second rack.

4. The device according to claim 3, wherein the elastic member is a torsion spring interposed between the first pinion and the second pinion to apply the elastic force to the first pinion and the second pinion in a rotation direction.

5. The device according to claim 4, wherein the elastic member applies the elastic force to move the first and second racks in a same direction as a direction in which the first and second output members move by the first and second actuators.

6. A device for assisting an actuator of a double clutch assembly having first and second actuators, the device comprising:
- a first elastic member configured to apply an elastic force to the first actuator;
- a second elastic member configured to apply an elastic force to the second actuator; and
- a pivot member configured to support the first elastic member and the second elastic member and be pivotally installed between the first elastic member and the second elastic member.

7. The device according to claim 6, wherein the first actuator includes a first output member moving upon an operation of the first actuator, and the first elastic member is a coil spring applying the elastic force in a longitudinal direction of the first output member.

8. The device according to claim 7, wherein the second actuator includes a second output member moving upon an operation of the second actuator, and the second elastic member is a coil spring applying the elastic force in a longitudinal direction of the second output member.

9. The device according to claim 8, wherein the pivot member is pivotally installed between the first output member and the second output member.

10. The device according to claim 9, wherein the pivot member includes a first support protrusion supporting the first elastic member and a second support protrusion supporting the second elastic member.

11. The device according to claim 10, wherein the first output member includes a support tap protruding from one side thereof, an upper end of the first elastic member is supported on the support tap of the first output member, and a lower end of the first elastic member is supported by the first support protrusion of the pivot member.

12. The device according to claim 11, wherein the second output member includes a support tap protruding from one side thereof, an upper end of the second elastic member is supported on the support tap of the second output member, and a lower end of the second elastic member is supported by the second support protrusion of the pivot member.

13. A double clutch assembly, comprising:
- first and second clutches configured to be separately operated from each other;
- first and second actuators configured to engage or disengage the first and second clutches, respectively;
- first and second force transfer portions configured to transfer forces applied by the first and second actuators to the first and second clutches; and
- a device configured to assist the first and second actuators, the device configured to selectively apply an assistance force to the first and second actuators,
- wherein the device uses an elastic force of an elastic member to apply the assistance force to the first and second actuators.

* * * * *